(12) United States Patent
Hampel et al.

(10) Patent No.: US 11,632,704 B2
(45) Date of Patent: Apr. 18, 2023

(54) TECHNIQUES FOR INTEGRATED ACCESS AND BACKHAUL TOPOLOGY DISCOVERY

(71) Applicant: QUALCOMM Incorporated, San Diego, CA (US)

(72) Inventors: Karl Georg Hampel, Hoboken, NJ (US); Luis Fernando Brisson Lopes, Swindon (GB); Navid Abedini, Somerset, NJ (US); Jianghong Luo, Skillman, NJ (US); Tao Luo, San Diego, CA (US); Junyi Li, Chester, NJ (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/028,526

(22) Filed: Sep. 22, 2020

(65) Prior Publication Data

US 2021/0092666 A1 Mar. 25, 2021

Related U.S. Application Data

(60) Provisional application No. 62/905,821, filed on Sep. 25, 2019.

(51) Int. Cl.
*H04W 40/24* (2009.01)
*H04W 76/11* (2018.01)
(Continued)

(52) U.S. Cl.
CPC ....... *H04W 40/246* (2013.01); *H04W 68/005* (2013.01); *H04W 76/11* (2018.02); *H04W 88/14* (2013.01)

(58) Field of Classification Search
CPC ... H04W 40/00; H04W 40/24; H04W 40/246; H04W 76/00; H04W 76/10; H04W 76/11; H04W 84/14
See application file for complete search history.

(56) References Cited

U.S. PATENT DOCUMENTS

| 2021/0058826 A1* | 2/2021 | Mao | H04W 28/0933 |
| 2021/0105622 A1* | 4/2021 | Rajadurai | H04L 63/164 |

(Continued)

FOREIGN PATENT DOCUMENTS

EP 3478019 A1 5/2019

OTHER PUBLICATIONS

Nokia, et al, "BAP layer modelling and configuration", Aug. 26-30, 2019, 3GPP TSG-RAN, WG2 Meeting #107 R2-1910038, pp. 1-3. (Year: 2019).*

(Continued)

*Primary Examiner* — Robert C Scheibel
(74) *Attorney, Agent, or Firm* — Dalei Dong; Harrity & Harrity, LLP

(57) ABSTRACT

Various aspects of the present disclosure generally relate to wireless communication. In some aspects, a network node may receive, via a mobile termination (MT) and from a central unit (CU) of a donor network node, a first message that includes first information associated with a token. The network node may transmit, via a distributed unit (DU) and to the CU of the donor network node, a second message that includes second information associated with the token, to thereby indicate collocation of the MT and the DU. Numerous other aspects are provided.

30 Claims, 11 Drawing Sheets

(51) Int. Cl.
    *H04W 88/14*    (2009.01)
    *H04W 68/00*    (2009.01)

(56) References Cited

U.S. PATENT DOCUMENTS

| | | | |
|---|---|---|---|
| 2021/0298000 A1* | 9/2021 | Park | H04W 72/042 |
| 2021/0345345 A1* | 11/2021 | Liu | H04W 72/04 |
| 2021/0345369 A1* | 11/2021 | Teyeb | H04W 72/1268 |

OTHER PUBLICATIONS

Nokia, et al, "Further details of BAP header and routing", Aug. 26-30, 2019, 3GPP TSG-RAN, WG2 Meeting #107 R2-1910039, pp. 1-3. (Year: 2019).*

Ericsson, "Signaling Aspects of BH RLC Channel and BAP Layer Configuration", Aug. 26-30, 2019, 3GPP TSG-RAN, WG3 Meeting #105, R3-193734, pp. 1-5. (Year: 2019).*

International Search Report and Written Opinion——dated Feb. 10, 2021.

Qualcomm: "CR to 38.401 on Integrated Access and Backhaul for NR,", 3GPP Draft, GPP TSG-RAN WG3 Meeting #103, R3-190188, IAB Baseline for 38401, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 15, 2019-Mar. 1, 2019, Feb. 15, 2019 (Feb. 15, 2019), XP051604132, 16 Pages, Retrieved from the Internet: URL: http://www.3gpp.org/ftp/tsg%5Fran/WG3%5Flu/TSGR3%5F103/Docs/R3%2D190188%2Ezip. [retrieved on Feb. 15, 2019] the whole document.

* cited by examiner

TECHNIQUES FOR INTEGRATED ACCESS AND BACKHAUL TOPOLOGY DISCOVERY

CROSS-REFERENCE TO RELATED APPLICATION

This patent application claims priority to U.S. Provisional Patent Application No. 62/905,821, filed on Sep. 25, 2019, entitled "TECHNIQUES FOR INTEGRATED ACCESS AND BACKHAUL TOPOLOGY DISCOVERY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for integrated access and backhaul (IAB) topology discovery.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a network node includes: receiving, via a mobile termination (MT) and from a central unit (CU) of a donor network node, a first message that includes first information associated with a token; and transmitting, via a distributed unit (DU) and to the CU of the donor network node, a second message that includes second information associated with the token, to thereby indicate collocation of the MT and the DU.

In some aspects, the network node is an integrated access and backhaul (IAB) node.

In some aspects, the token is a backhaul adaptation protocol (BAP) address of the network node.

In some aspects, the second message further includes an identifier of the DU, and the identifier of the DU is an F1-application protocol (F1-AP) identifier of the DU.

In some aspects, the method includes establishing a radio resource control (RRC) connection to the CU of the donor network node prior to receiving the first message.

In some aspects, the first message is received via RRC signaling, and the second message is transmitted via F1-AP signaling.

In some aspects, the second message is an F1-AP setup request message, an F1-AP DU configuration update message, or an F1-AP DU status indication message.

In some aspects, the method includes receiving, via the MT, a packet addressed with the token.

In some aspects, the method includes receiving, via the MT, a packet addressed with another token; and providing the packet to the DU for forwarding to another network node associated with the other token.

In some aspects, the method includes receiving, via the MT, a message that includes information for the DU; and providing the information to the DU.

In some aspects, the method includes receiving, via the MT, a configuration for the DU; and configuring the DU according to the configuration.

In some aspects, the method includes receiving a configuration that identifies a first portion of a resource that is to be used by the MT and a second portion of the resource that is to be used by the DU.

In some aspects, a method of wireless communication performed by a CU of a donor network node includes: receiving, from a DU of a network node, a message that includes information associated with a token; and identifying a collocation of an MT of the network node and the DU based at least in part on the information.

In some aspects, the method includes storing a mapping of an identifier of the MT to an identifier of the DU.

In some aspects, the network node is an IAB node.

In some aspects, the token is a BAP address of the network node.

In some aspects, the message further includes an identifier of the DU, and the identifier of the DU is an F1-AP identifier of the DU.

In some aspects, the method includes establishing an RRC connection to the network node.

In some aspects, the message is received via F1-AP signaling.

In some aspects, the message is an F1-AP setup request message, an F1-AP DU configuration update message, or an F1-AP DU status indication message.

In some aspects, the method includes transmitting, to the MT of the network node, another message that includes information associated with the token, and the other message is transmitted via RRC signaling.

In some aspects, the method includes transmitting, to the MT of the network node, a packet addressed with the token.

In some aspects, the method includes transmitting, to the MT of the network node, a packet addressed with another token that is to be forwarded by the DU to another network node associated with the other token.

In some aspects, the method includes transmitting, to the MT of the network node, a message that includes information for the DU.

In some aspects, the method includes transmitting, to the MT of the network node, a configuration for the DU.

In some aspects, the method includes transmitting a configuration that identifies a first portion of a resource that is to be used by the MT and a second portion of the resource that is to be used by the DU.

In some aspects, a network node for wireless communication includes a memory and one or more processors operatively coupled to the memory, the memory and the one or more processors configured to: receive, via an MT and from a CU of a donor network node, a first message that includes first information associated with a token; and transmit, via a DU and to the CU of the donor network node, a second message that includes second information associated with the token, to thereby indicate collocation of the MT and the DU.

In some aspects, the network node is an IAB node.

In some aspects, the token is a BAP address of the network node.

In some aspects, the second message further includes an identifier of the DU, and the identifier of the DU is an F1-AP identifier of the DU.

In some aspects, the one or more processors are further configured to establish an RRC connection to the CU of the donor network node prior to receiving the first message.

In some aspects, the first message is received via RRC signaling, and the second message is transmitted via F1-AP signaling.

In some aspects, the second message is an F1-AP setup request message, an F1-AP DU configuration update message, or an F1-AP DU status indication message.

In some aspects, the one or more processors are further configured to receive, via the MT, a packet addressed with the token.

In some aspects, the one or more processors are further configured to: receive, via the MT, a packet addressed with another token; and provide the packet to the DU for forwarding to another network node associated with the other token.

In some aspects, the one or more processors are further configured to: receive, via the MT, a message that includes information for the DU; and provide the information to the DU.

In some aspects, the one or more processors are further configured to: receive, via the MT, a configuration for the DU; and configure the DU according to the configuration.

In some aspects, the one or more processors are further configured to receive a configuration that identifies a first portion of a resource that is to be used by the MT and a second portion of the resource that is to be used by the DU.

In some aspects, a CU of a donor network node for wireless communication includes a memory and one or more processors operatively coupled to the memory, the memory and the one or more processors configured to: receive, from a DU of a network node, a message that includes information associated with a token; and identify a collocation of an MT of the network node and the DU based at least in part on the information.

In some aspects, the one or more processors are further configured to: store a mapping of an identifier of the MT to an identifier of the DU.

In some aspects, the network node is an IAB node.

In some aspects, the token is a BAP address of the network node.

In some aspects, the message further includes an identifier of the DU, and the identifier of the DU is an F1-AP identifier of the DU.

In some aspects, the one or more processors are further configured to: establish an RRC connection to the network node.

In some aspects, the message is received via F1-AP signaling.

In some aspects, the message is an F1-AP setup request message, an F1-AP DU configuration update message, or an F1-AP DU status indication message.

In some aspects, the one or more processors are further configured to transmit, to the MT of the network node, another message that includes information associated with the token, and the other message is transmitted via RRC signaling.

In some aspects, the one or more processors are further configured to transmit, to the MT of the network node, a packet addressed with the token.

In some aspects, the one or more processors are further configured to transmit, to the MT of the network node, a packet addressed with another token that is to be forwarded by the DU to another network node associated with the other token.

In some aspects, the one or more processors are further configured to transmit, to the MT of the network node, a message that includes information for the DU.

In some aspects, the one or more processors are further configured to transmit, to the MT of the network node, a configuration for the DU.

In some aspects, the one or more processors are further configured to transmit a configuration that identifies a first portion of a resource that is to be used by the MT and a second portion of the resource that is to be used by the DU.

In some aspects, a non-transitory computer-readable medium storing a set of instructions for wireless communication includes one or more instructions that, when executed by one or more processors of a network node, cause the network node to: receive, via an MT and from a CU of a donor network node, a first message that includes first information associated with a token; and transmit, via a DU and to the CU of the donor network node, a second message that includes second information associated with the token, to thereby indicate collocation of the MT and the DU.

In some aspects, the network node is an IAB node.

In some aspects, the token is a BAP address of the network node.

In some aspects, the second message further includes an identifier of the DU, and the identifier of the DU is an F1-AP identifier of the DU.

In some aspects, the one or more instructions further cause the network node to: establish an RRC connection to the CU of the donor network node prior to receiving the first message.

In some aspects, the first message is received via RRC signaling, and the second message is transmitted via F1-AP signaling.

In some aspects, the second message is an F1-AP setup request message, an F1-AP DU configuration update message, or an F1-AP DU status indication message.

In some aspects, the one or more instructions further cause the network node to: receive, via the MT, a packet addressed with the token.

In some aspects, the one or more instructions further cause the network node to: receive, via the MT, a packet addressed with another token; and provide the packet to the DU for forwarding to another network node associated with the other token.

In some aspects, the one or more instructions further cause the network node to: receive, via the MT, a message that includes information for the DU; and provide the information to the DU.

In some aspects, the one or more instructions further cause the network node to: receive, via the MT, a configuration for the DU; and configure the DU according to the configuration.

In some aspects, the one or more instructions further cause the network node to receive a configuration that identifies a first portion of a resource that is to be used by the MT and a second portion of the resource that is to be used by the DU.

In some aspects, a non-transitory computer-readable medium storing a set of instructions for wireless communication includes one or more instructions that, when executed by one or more processors of a CU of a donor network node, cause the CU to: receive, from a DU of a network node, a message that includes information associated with a token; and identify a collocation of an MT of the network node and the DU based at least in part on the information.

In some aspects, the one or more instructions further cause the CU to store a mapping of an identifier of the MT to an identifier of the DU.

In some aspects, the network node is an IAB node.

In some aspects, the token is a BAP address of the network node.

In some aspects, the message further includes an identifier of the DU, and the identifier of the DU is an F1-AP identifier of the DU.

In some aspects, the one or more instructions further cause the CU to: establish an RRC connection to the network node.

In some aspects, the message is received via F1-AP signaling.

In some aspects, the message is an F1-AP setup request message, an F1-AP DU configuration update message, or an F1-AP DU status indication message.

In some aspects, the one or more instructions further cause the CU to transmit, to the MT of the network node, another message that includes information associated with the token, and the other message is transmitted via RRC signaling.

In some aspects, the one or more instructions further cause the CU to transmit, to the MT of the network node, a packet addressed with the token.

In some aspects, the one or more instructions further cause the CU to transmit, to the MT of the network node, a packet addressed with another token that is to be forwarded by the DU to another network node associated with the other token.

In some aspects, the one or more instructions further cause the CU to transmit, to the MT of the network node, a message that includes information for the DU.

In some aspects, the one or more instructions further cause the CU to: transmit, to the MT of the network node, a configuration for the DU.

In some aspects, the one or more instructions further cause the CU to transmit a configuration that identifies a first portion of a resource that is to be used by the MT and a second portion of the resource that is to be used by the DU.

In some aspects, an apparatus for wireless communication includes: means for receiving, via an MT and from a CU of a donor network node, a first message that includes first information associated with a token; and means for transmitting, via a DU and to the CU of the donor network node, a second message that includes second information associated with the token, to thereby indicate collocation of the MT and the DU.

In some aspects, the apparatus is an IAB node.

In some aspects, the token is a BAP address of the apparatus.

In some aspects, the second message further includes an identifier of the DU, and the identifier of the DU is an F1-AP identifier of the DU.

In some aspects, the apparatus includes means for establishing an RRC connection to the CU of the donor network node prior to receiving the first message.

In some aspects, the first message is received via RRC signaling, and the second message is transmitted via F1-AP signaling.

In some aspects, the second message is an F1-AP setup request message, an F1-AP DU configuration update message, or an F1-AP DU status indication message.

In some aspects, the apparatus includes means for receiving, via the MT, a packet addressed with the token.

In some aspects, the apparatus includes means for receiving, via the MT, a packet addressed with another token; and means for providing the packet to the DU for forwarding to another network node associated with the other token.

In some aspects, the apparatus includes means for receiving, via the MT, a message that includes information for the DU; and means for providing the information to the DU.

In some aspects, the apparatus includes means for receiving, via the MT, a configuration for the DU; and means for configuring the DU according to the configuration.

In some aspects, the apparatus includes means for receiving a configuration that identifies a first portion of a resource that is to be used by the MT and a second portion of the resource that is to be used by the DU.

In some aspects, an apparatus for wireless communication includes: means for receiving, from a DU of a network node, a message that includes information associated with a token; and means for identifying a collocation of an MT of the network node and the DU based at least in part on the information.

In some aspects, the apparatus includes means for storing a mapping of an identifier of the MT to an identifier of the DU.

In some aspects, the network node is an IAB node.

In some aspects, the token is a BAP address of the network node.

In some aspects, the message further includes an identifier of the DU, and the identifier of the DU is an F1-AP identifier of the DU.

In some aspects, the apparatus includes means for establishing an RRC connection to the network node.

In some aspects, the message is received via F1-AP signaling.

In some aspects, the message is an F1-AP setup request message, an F1-AP DU configuration update message, or an F1-AP DU status indication message.

In some aspects, the apparatus includes means for transmitting, to the MT of the network node, another message that includes information associated with the token, and the other message is transmitted via RRC signaling.

In some aspects, the apparatus includes means for transmitting, to the MT of the network node, a packet addressed with the token.

In some aspects, the apparatus includes means for transmitting, to the MT of the network node, a packet addressed with another token that is to be forwarded by the DU to another network node associated with the other token.

In some aspects, the apparatus includes means for transmitting, to the MT of the network node, a message that includes information for the DU.

In some aspects, the apparatus includes means for transmitting, to the MT of the network node, a configuration for the DU.

In some aspects, the apparatus includes means for transmitting a configuration that identifies a first portion of a resource that is to be used by the MT and a second portion of the resource that is to be used by the DU.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
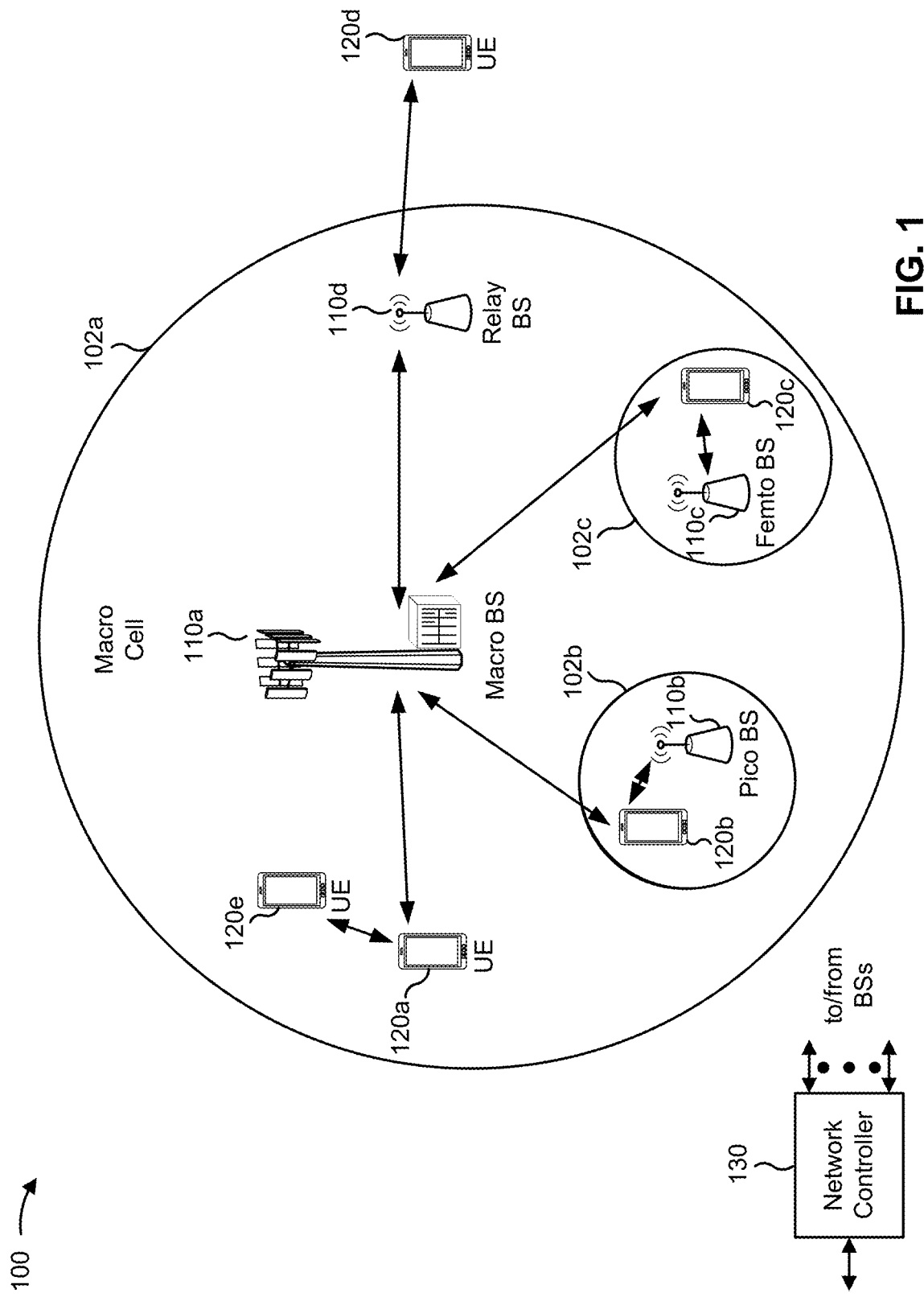
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
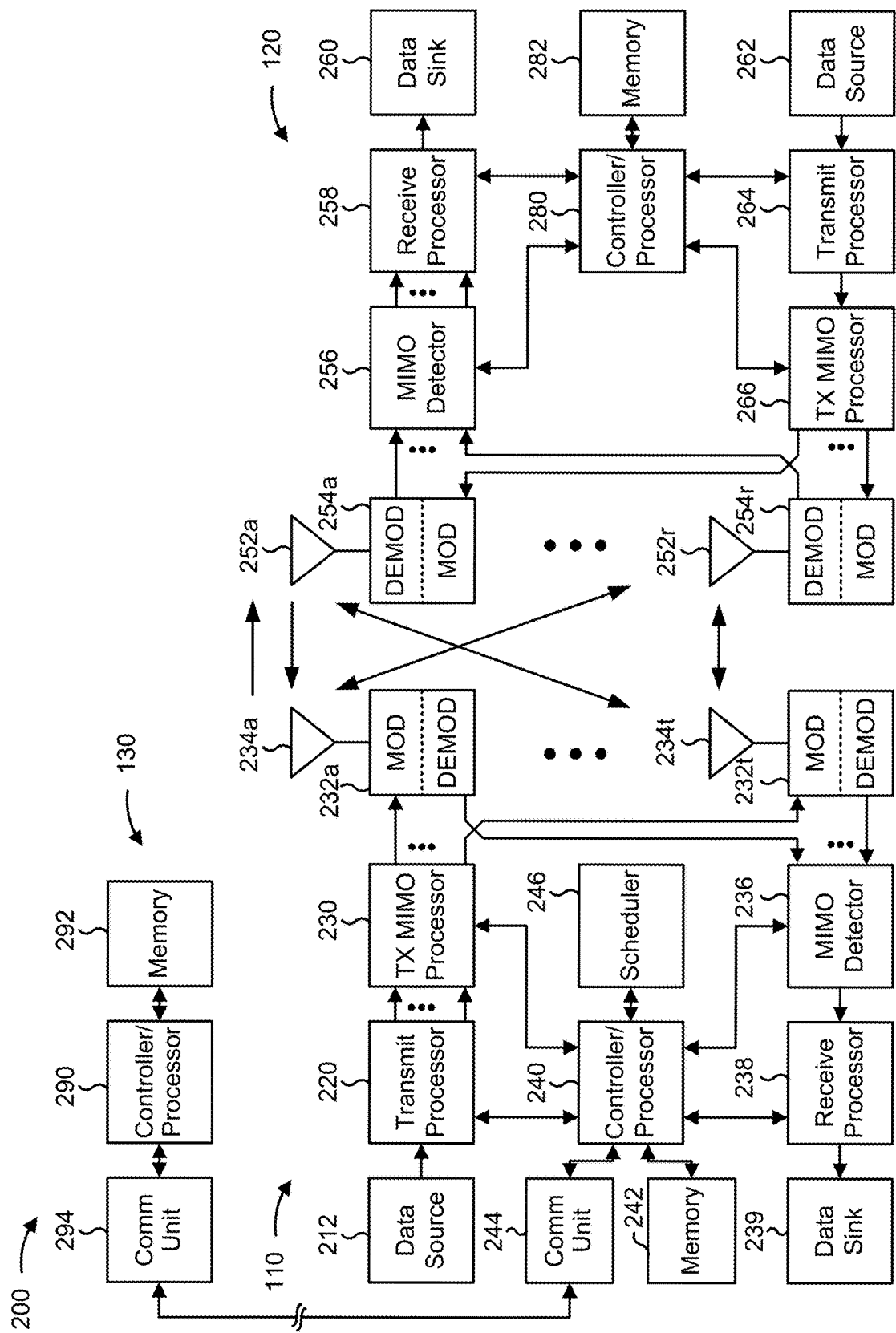
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with IAB topology discovery, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, a network node (e.g., a base station 110, a UE 120, an IAB node, and/or the like) may include means for receiving, via an MT and from a CU of a donor network node, a first message that includes first information associated with a token, means for transmitting, via a DU and to the CU of the donor network node, a second message that includes second information associated with the token, to thereby indicate collocation of the MT and the DU, and/or the like. In some aspects, such means may include one or more components of base station 110 or UE 120 described in connection with FIG. 2, such as antenna 234, DEMOD 232, MIMO detector 236, receive processor 238, controller/processor 240, transmit processor 220, TX MIMO processor 230, MOD 232, controller/processor 280, transmit processor 264, TX MIMO processor 266, MOD 254, antenna 252, DEMOD 254, MIMO detector 256, receive processor 258, and/or the like.

In some aspects, a donor network node (e.g., a base station 110, an IAB donor node, a CU, and/or the like) may include means for receiving, from a DU of the network node, a message that includes information associated with a token, means for identifying a collocation of an MT of the network node and the DU based at least in part on the information, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or the like.

As indicated above, FIG. 2 is provided as an example. Other examples may differ from what is described with regard to FIG. 2.

Figure 3:
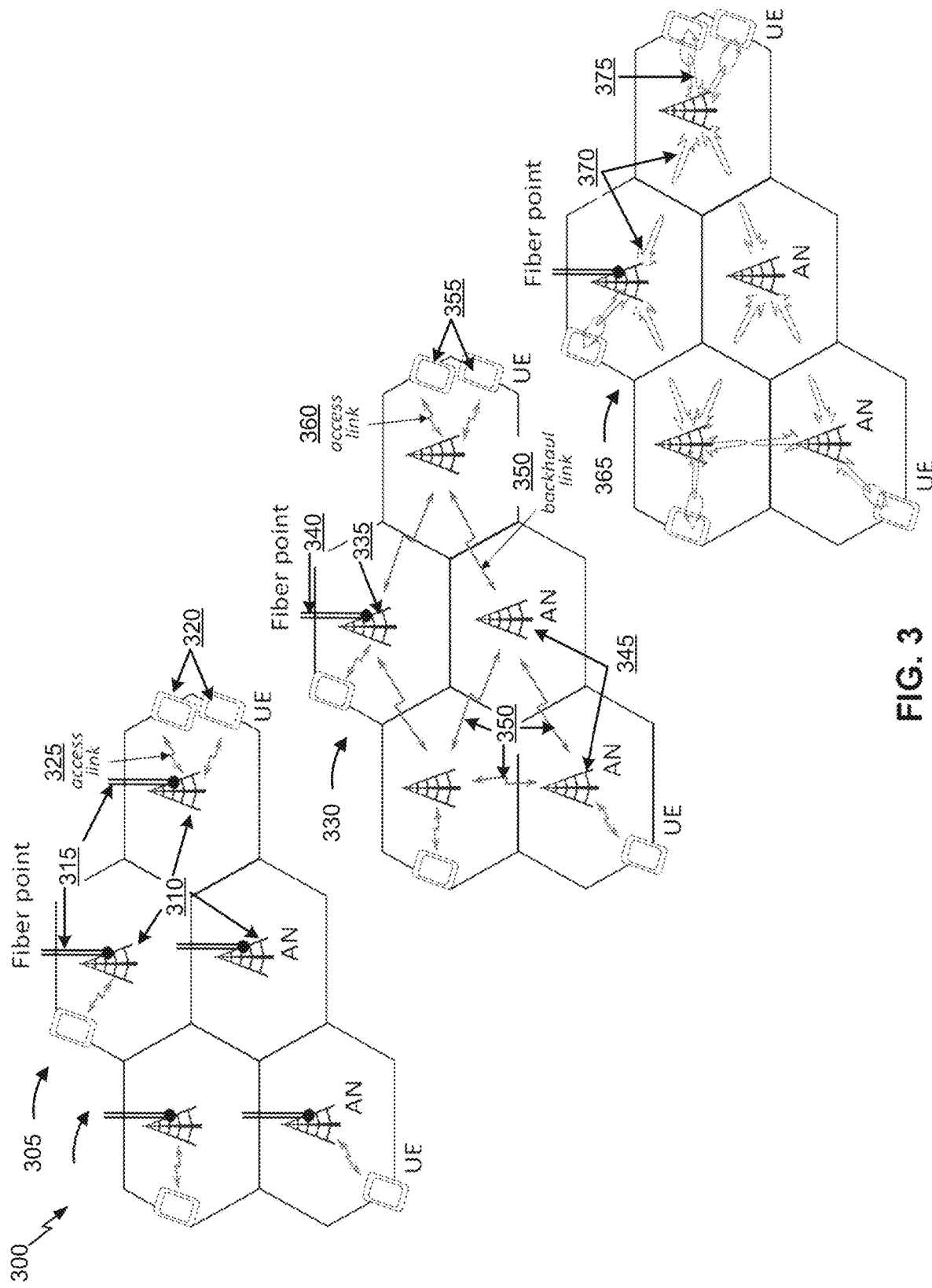
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 as shown in FIG. 1. In some aspects, a UE 320 shown in FIG. 3 may be a UE 120 as shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 as shown in FIG. 1. In some aspects, a UE 355 shown in FIG. 3 may be a UE 120 as shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples are possible and may differ from what was described with regard to FIG. 3.

Figure 4:
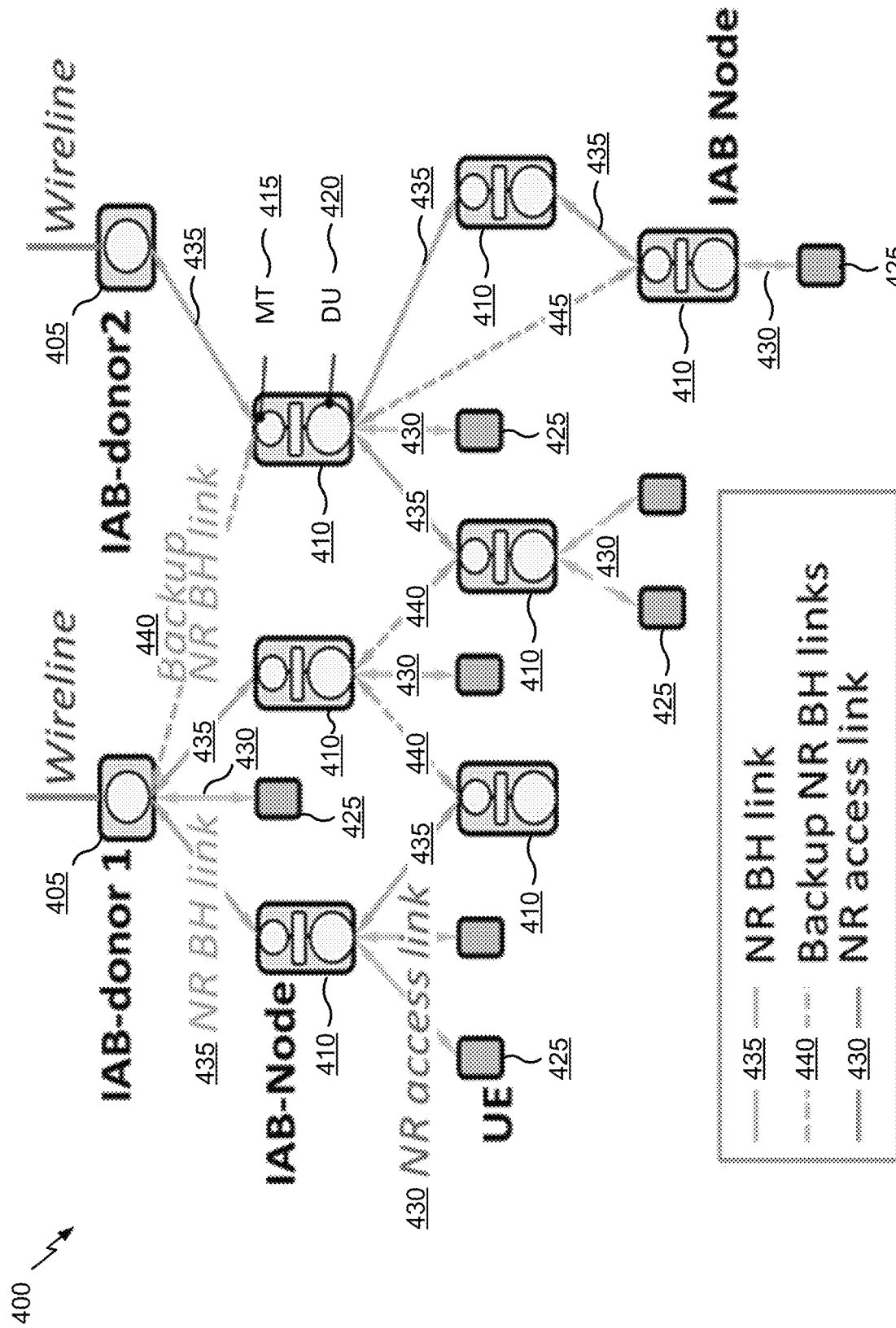
FIG. 4 is a diagram illustrating an example of an integrated access and backhaul (IAB) network architecture, in accordance with various aspects of the disclosure.

FIG. 4 is a diagram illustrating an example 400 of an IAB network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (AMF). In some aspects, an anchor node 405 may include a base station 110, such as an anchor base station, as described above in connection with FIG. 3. In some aspects, an anchor node 405 may be associated with a central unit (CU) which may perform access node controller (ANC) functions, AMF functions, and/or the like.

As further shown in FIG. 4, the IAB network may include non-anchor nodes 410, or IAB nodes (shown as IAB-Node). A non-anchor node 410 may provide IAB functionality, and may include mobile termination (MT) functions 415 (also sometimes referred to as UE functions (UEF)) and distributed unit (DU) functions 420 (also sometimes referred to as access node functions (ANF)). The MT functions 415 may provide functions of a UE 120, as described above. The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405, or between a UE 425 and a non-anchor node 410, may be referred to as an access link 430. Access link 430 may be a wireless access link that provides a UE 425 with radio access to a core network via an anchor node 405, and optionally via one or more non-anchor nodes 410. Thus, the network illustrated in FIG. 4 may be referred to as a multi-hop IAB network.

As further shown in FIG. 4, a link between an anchor node 405 and a non-anchor node 410, or between two non-anchor nodes 410, may be referred to as a backhaul link 435.

Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 445 may be used if a primary backhaul link fails, becomes congested, becomes overloaded, and/or the like. Some propagation delay may be present between nodes, and the delay may be mitigated using a timing advance (TA) value. Furthermore, some nodes may be associated with switching limitations, processing limitations, and/or the like, which may be mitigated using a timing assistance value, such as a delta value and/or the like.

As indicated above, FIG. 4 is provided as an example. Other examples are possible and may differ from what was described with regard to FIG. 4.

Figure 5:
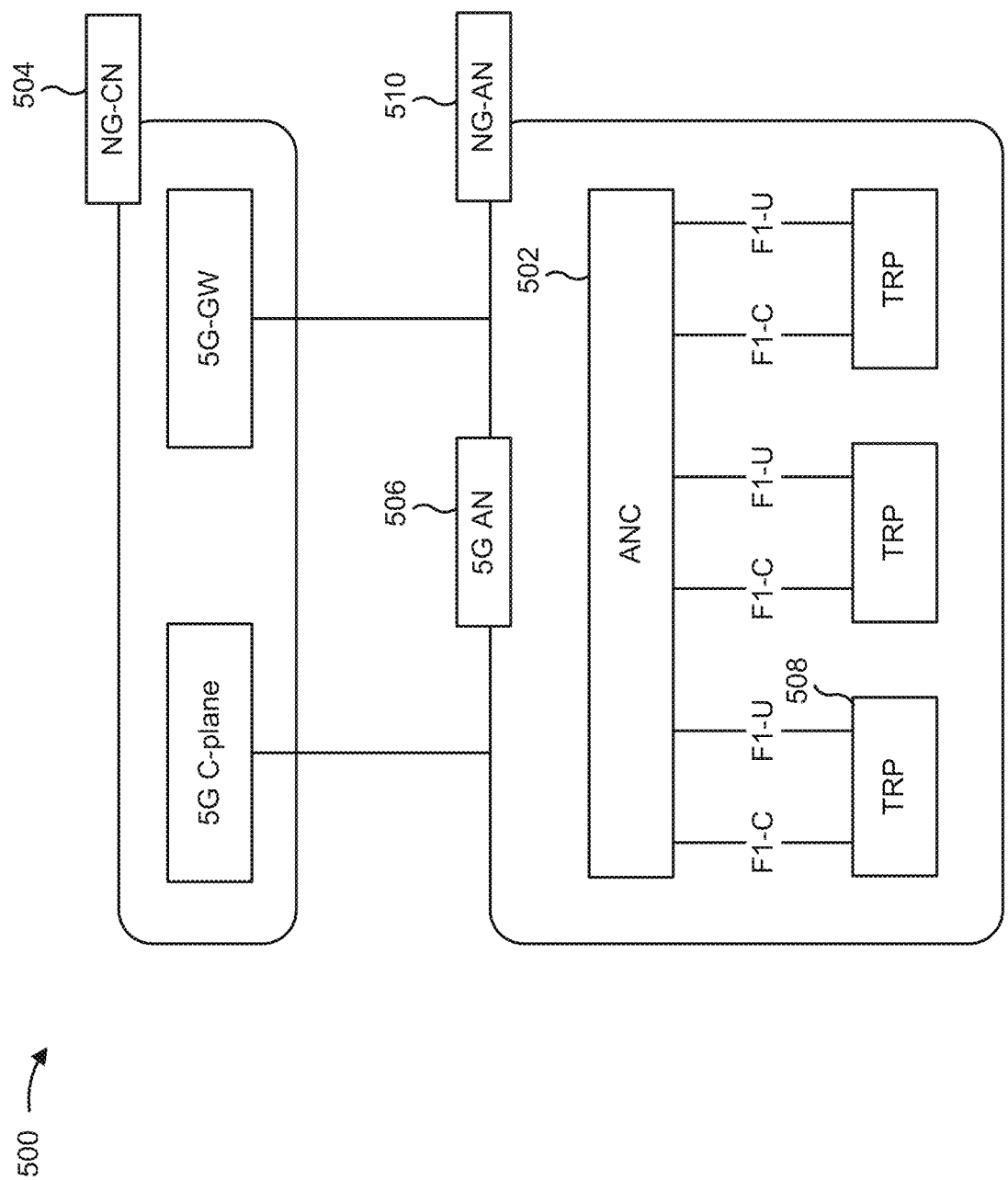
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
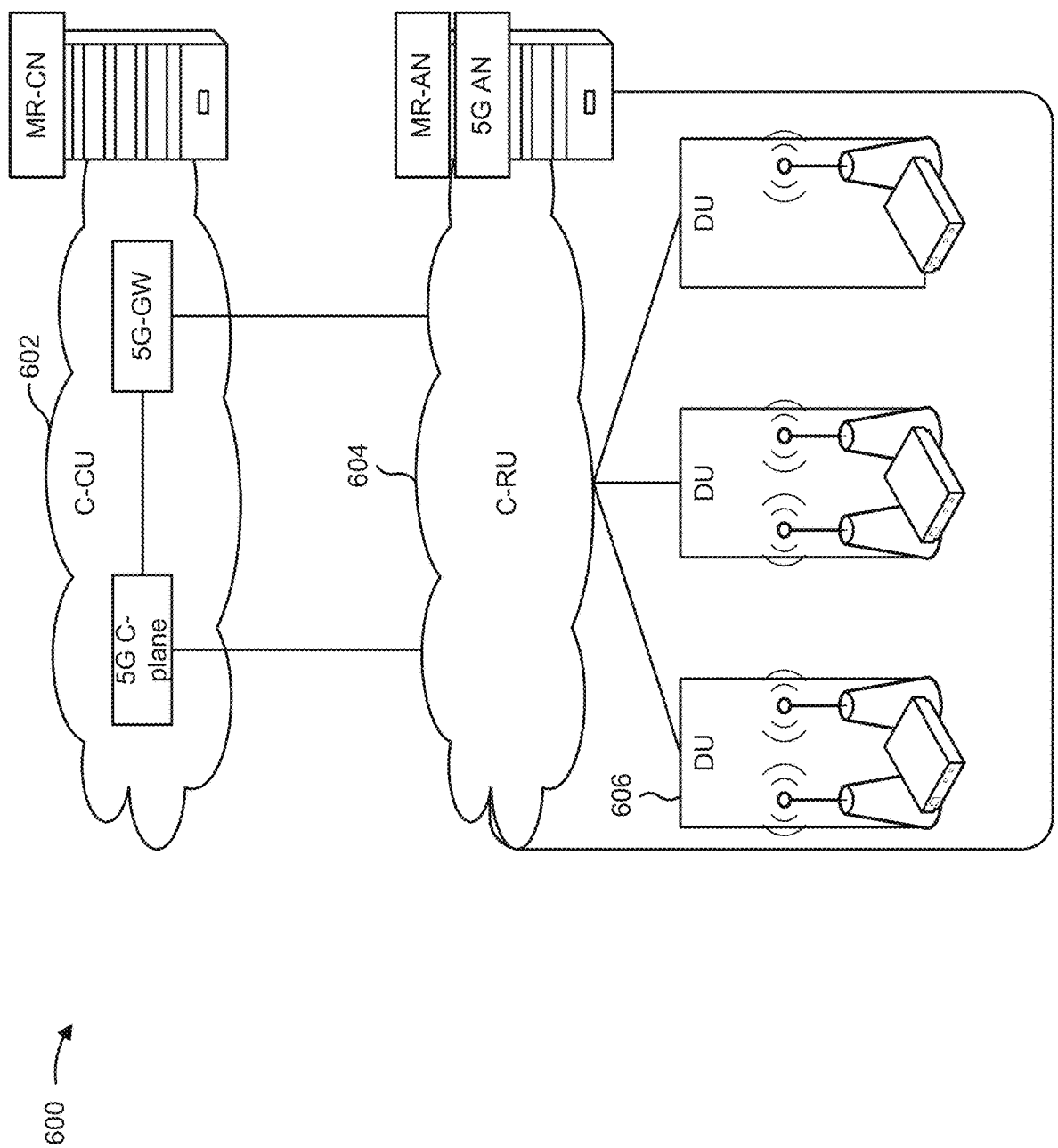
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In a wireless network, a plurality of wireless communication devices may communicate over an IAB network. As described above, an IAB network may include an IAB donor (which may include a base station that is connected to a wireline backhaul in the wireless network) and one or more IAB nodes (which may include one or more base stations that are communicatively connected to the IAB donor and/or another IAB node via a backhaul link). A wireless communication device, such as a UE, may communicate with an IAB donor or an IAB node via an access link. An IAB node that is downstream in the IAB network from another IAB node or an IAB donor may be referred to as a child node, and the other IAB node or IAB donor may be referred to as a parent node.

An IAB donor may include a CU node, component, endpoint, and/or function (which may be referred to herein as a CU, a CU node, or an IAB CU) and a DU node, component, endpoint, and/or function (which may be referred to herein as a DU, a DU node, or an IAB DU). The CU may control an IAB network via configuration. The DU may schedule communication of the IAB donors included in the IAB network. An IAB node may include an MT node, component, endpoint, unit, and/or function (which may be referred to herein as an MT, MT node, or an IAB MT) and a DU When an IAB node is establishing an IAB capable connection with an IAB donor, the MT node of the IAB node may first establish a connection (e.g., a radio resource control (RRC) connection) with a CU of the IAB donor. Subsequently, the DU node of the IAB node may establish a connection (e.g., an F1 control plane (F1-C) connection) with the CU of the IAB donor. In such cases, the CU of the IAB donor may be unaware of a collocation relationship of the MT node and the DU node since the MT node and DU node connections are established separately. Accordingly, the CU cannot utilize the collocation relationship for performing packet routing in the IAB network, performing access link resource management, and/or the like.

Some aspects described herein provide techniques and apparatuses for indicating collocation of the MT node and the DU node at the IAB node. In some aspects, the CU of the IAB donor may provide a token to the IAB node when a connection is established between the MT node and the CU. In addition, the IAB node may provide the token (or a related token) back to the CU when a connection is established between the DU node and the CU. Based at least in part on the received token corresponding to the provided token, the CU can determine that the MT node and the DU node are collocated at the IAB node. Accordingly, the CU may perform packet routing, resource management, network topology updates (e.g., updates to child-parent network node relationships), and/or the like, in accordance with the collocation relationship of the MT node and the DU node.

Figure 7:
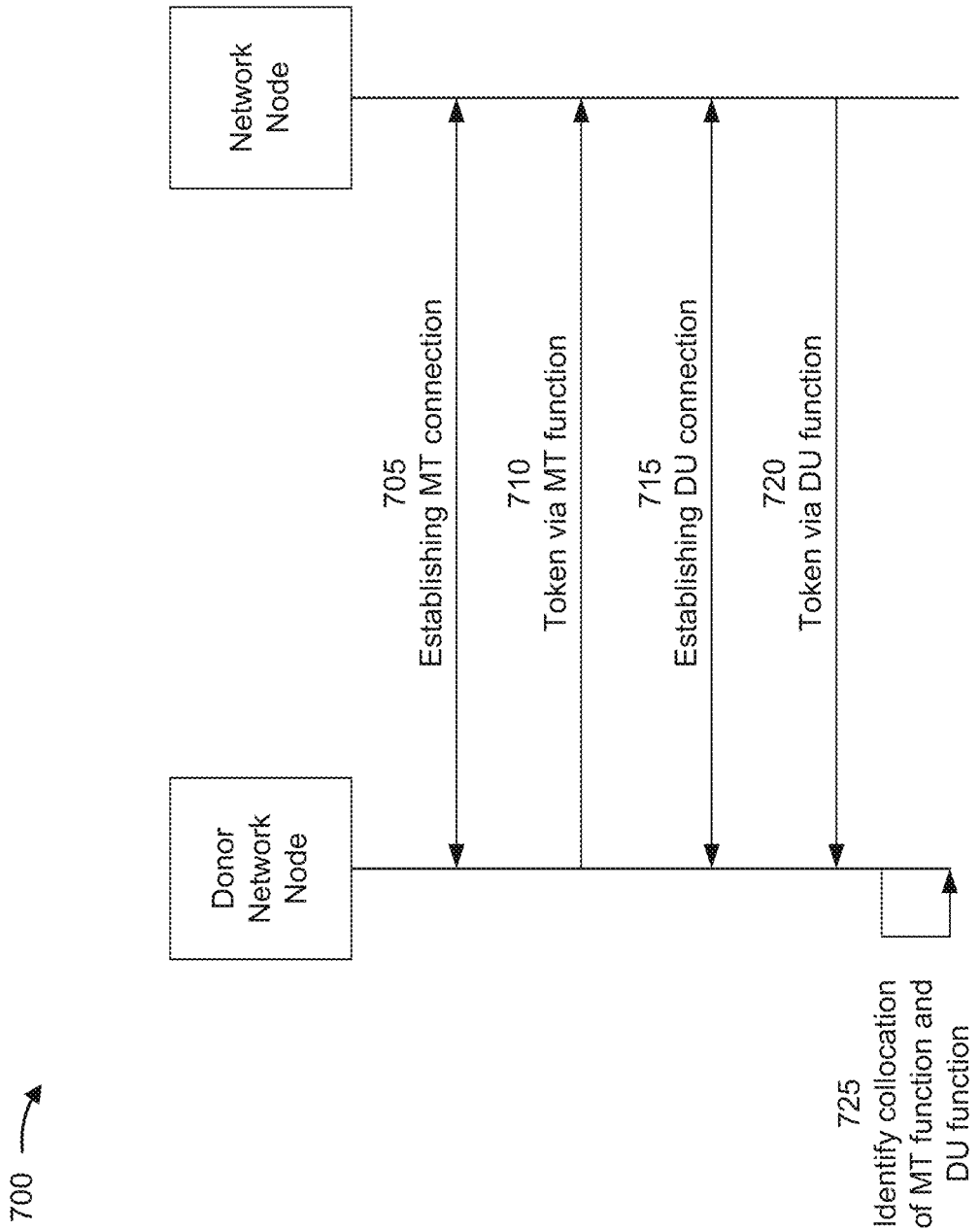
FIG. 7 is a diagram illustrating an example of IAB topology discovery, in accordance with various aspects of the present disclosure.

FIG. 7 is a diagram illustrating an example 700 of IAB topology discovery, in accordance with various aspects of the present disclosure. As shown in FIG. 7, a donor network node and a network node may communicate to establish a connection. In some aspects, the donor network node may support a wireless relay network, and the network node may be a relay of the wireless relay network. In some aspects, the wireless relay network may be an IAB network. Accordingly, the donor network node may be an IAB donor (e.g., an IAB donor gNB) and the network node may be an IAB node in an IAB network of the IAB donor.

In some aspects, the donor network node may be a first base station (e.g., a first BS 110) and the network node may be a second base station (e.g., a second BS 110). In such a case, the donor network node may include a CU node (e.g., an IAB donor CU, a gNB CU, and/or the like) and one or more DU nodes (e.g., one or more IAB donor DUs), and the network node may include an MT node (e.g., an IAB MT) and a DU node (e.g., an IAB DU, a gNB DU, and/or the like). In some aspects, the MT node may provide an MT function of the network node, and the DU node may provide a DU function of the network node. In some aspects, actions described herein as being performed by the CU of the donor network node may be performed by a control plane CU of the donor network node.

As shown in FIG. 7 and by reference number 705, the network node and the donor network node may establish an MT connection. That is, the MT node of the network node and the CU of the donor network node may establish a connection. The connection may be an RRC connection. In some aspects, the MT node may initiate a connection procedure with the CU, to thereby establish the connection. For example, the network node may launch the MT node during an initialization of the network node, and the MT node may initiate a connection procedure with the CU.

In some aspects, the CU may transmit, via the connection (e.g., RRC connection), a configuration that assigns one or more backhaul adaptation protocol (BAP) addresses for the MT node. A BAP address may be used by the donor network node and the network node for routing packets in the wireless relay network (e.g., IAB network).

As shown by reference number 710, the donor network node may transmit, and the network node may receive, a message including first information associated with a token. For example, the CU of the donor network node may transmit, via the connection (e.g., RRC connection) established between the CU and the MT node of the network node, the first information associated with the token to the MT node. In some aspects, the token may identify a BAP address of the one or more BAP addresses assigned to the MT node. Alternatively, in some aspects, the token may be a BAP address of the one or more BAP addresses assigned to the MT node.

In some aspects, the network node (e.g., the MT node) may store the first information associated with the token for subsequent use by the DU node of the network node (e.g., the DU node may determine that the token is associated with the MT node, and may transmit information associated with the token), as described below. In some aspects, the network node may store the first information associated with the token in association with an identifier of the CU. For example, an identifier of the CU received by the MT node during establishment of the connection (e.g., RRC connection) between the CU and the MT node.

In some aspects, the CU, prior to transmitting the first information associated with the token, may assign the token to the network node. For example, the CU may generate the token according to a BAP address for the network node, and may store the generated token in association with the MT node. For example, the CU may store the token in association with an identifier of the MT node. The CU may have received the identifier from the MT node, or generated the identifier for the MT node, during establishment of the connection (e.g., RRC connection) between the CU and the MT node.

As shown by reference number 715, the network node and the donor network node may establish a DU connection. That is, the DU node of the network node and the CU of the donor network node may establish a connection. In some aspects, the DU node may initiate a connection procedure with the CU, to thereby establish the connection. For example, the network node may launch the DU node during an initialization of the network node, and the DU node may initiate a connection procedure with the CU. In some aspects, the DU node may initiate the connection procedure with the CU after a connection (e.g., RRC connection) between the CU and the MT node of the network node has been established.

In some aspects, the connection between the CU and the DU node may be an F1-C connection. The F1-C connection may include an F1 application protocol (F1-AP) connection (e.g., as a top layer of the F1-C connection). Accordingly, the DU node may initiate an F1-AP connection procedure with the CU. For example, the DU node may initiate the F1-AP connection procedure by transmitting an F1-AP setup request message to the CU.

As shown by reference number 720, the network node may transmit, and the donor network node may receive, a message including second information associated with the token. For example, the DU node of the network node may transmit the message to the CU of the donor network node. The second information associated with the token may correspond to the first information associated with the token that the CU provided to the MT node of the network node.

In some aspects, the message may be a message of the F1-C connection procedure (e.g., the F1-AP connection procedure), or may be a message associated with another F1-C (e.g., F1-AP) procedure. For example, the message may be an F1-AP setup request message (e.g., of an F1-AP connection procedure), an F1-AP DU configuration update message (e.g., of an F1-AP connection procedure or an F1-AP update procedure), an F1-AP status indication message (e.g., of an F1-AP status indication procedure), and/or the like.

In some aspects, the message may further identify an identifier of the DU node. For example, the identifier may be an F1-AP DU identifier for the DU node. The DU node may have received the identifier from the CU, or generated the identifier, during establishment of the connection (e.g., F1-AP connection) between the CU and the DU node.

As shown by reference number 725, the donor network node may identify a collocation of the MT node of the network node and the DU node of the network node. For example, the CU of the donor network node may identify a collocation of the MT node and the DU node based at least in part on the second information associated with the token that was received from the DU node. For example, the CU may compare the first information associated with the token (e.g., that was provided to the MT node), that is stored by the CU, to the second information associated with the token that was received from the DU node. Continuing with the previous example, the CU may determine that the first information and the second information correspond (e.g., the token provided to the MT node corresponds to the token received from the DU node), to thereby determine that the MT node and the DU node are collocated at the network node.

In some aspects, based at least in part on determining the collocation of the MT node and the DU node, the CU may store a mapping of an association of the MT node and the DU node. For example, the CU may store a mapping of an identifier of the MT node to an identifier of the DU node. Accordingly, the CU may perform packet routing, resource management, network topology updates, and/or the like, in accordance with the mapping.

For example, the CU may transmit, and the MT node may receive, a message that includes information for the DU node. In particular, the CU may transmit the message that includes the information for the DU node, to the MT node, based at least in part on the mapping that associates the MT node and the DU node. In some aspects, the CU may assign a resource to the MT node and the DU node based at least in part on the mapping associating the MT node and the DU node. For example, the CU may allocate a first portion of the resource for the MT node (e.g., for a wireless link that is to be used by the MT node) and a second portion of the resource for the DU node (e.g., a wireless link that is to be used by the DU node).

In some aspects, the CU may transmit, and the MT node may receive, a configuration for the DU node. In particular, the CU may transmit the configuration for the DU node, to the MT node, based at least in part on the mapping associating the MT node and the DU node. The CU may transmit the configuration in a message that includes information associated with the token, thereby indicating that the configuration is to be applied to the MT node and the DU node. For example, the configuration may identify a routing entry (e.g., a BAP routing entry) for the MT node and the DU node. The routing entry may identify a next-hop network node for reaching another network node (e.g., a child network node) of the wireless relay network (e.g., IAB network).

In some aspects, the MT node may receive (e.g., on a backhaul radio link control (RLC) channel) a packet (e.g., from the DU of the donor network node, from a DU node of a parent network node, and/or the like) that is addressed with a token (e.g., BAP address) associated with the network node. In such a case, the MT node may determine that the token is associated with the network node, to thereby determine that the packet is intended for the network node.

In some aspects, the packet may be an Internet Protocol (IP) packet, and the DU of the donor network node may have addressed the packet with a token (e.g., BAP address) associated with the network node according to a mapping of IP addresses to tokens (e.g., BAP addresses) stored by the DU of the donor network node. For example, the MT node may be associated with an IP address, and the mapping may associate the IP address of the MT node with the token (e.g., BAP address) of the network node. In some aspects, the CU may have configured the DU of the donor network node with the mapping based at least in part on assigning the token to the network node.

In some aspects, the MT node may receive (e.g., on a backhaul RLC channel) a packet (e.g., from the DU of the donor network node, from a DU node of a parent network node, and/or the like) that is addressed with a token (e.g., BAP address) associated with another network node (e.g., a child network node). For example, the CU may cause the DU of the donor network node to transmit the packet to the MT node based at least in part on identifying a collocation of the MT node and the DU node, and determining that the DU node is an intermediate hop for the packet. Upon receiving the packet, the MT node may determine that the token of the packet is not associated with the network node, and provide the packet to the DU node (e.g., in accordance with a routing entry). The DU node may forward the packet to a next-hop network node in accordance with a configured routing entry for the DU node, as described above. Accordingly, the CU may utilize the mapping associating the MT node and the DU node for routing packets in the wireless relay network (e.g., IAB network).

As indicated above, FIG. 7 is provided as an example. Other examples may differ from what is described with respect to FIG. 7.

Figure 8:
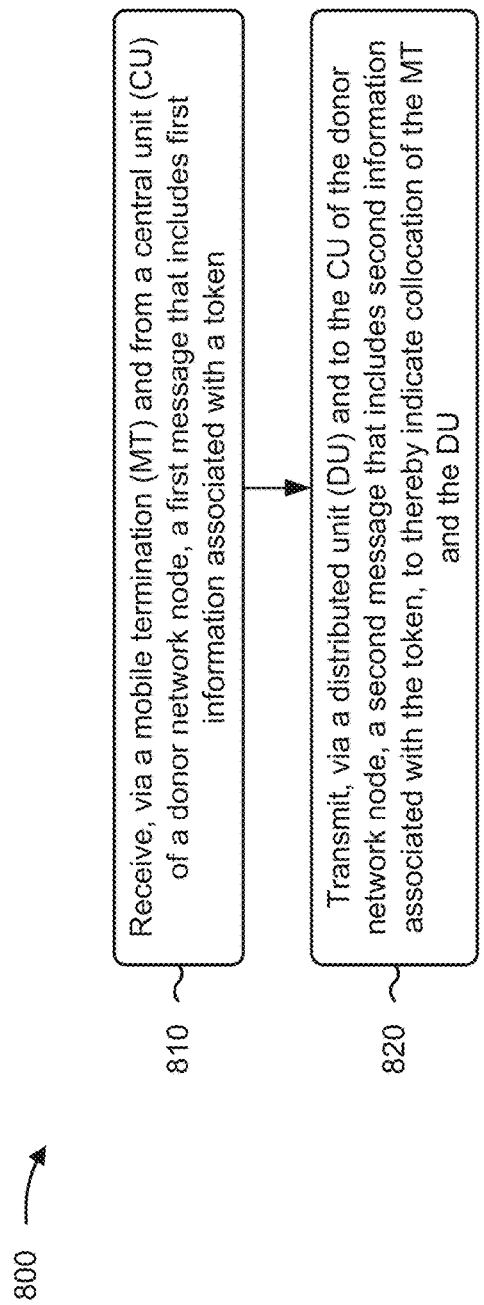
FIG. 8 is a diagram illustrating an example process performed, for example, by a network node, in accordance with various aspects of the present disclosure.

FIG. 8 is a diagram illustrating an example process 800 performed, for example, by a network node, in accordance with various aspects of the present disclosure. Example process 800 is an example where a network node (e.g., a BS 110, a UE 120, an IAB node, and/or the like) performs operations associated with IAB topology discovery.

As shown in FIG. 8, in some aspects, process 800 may include receiving, via an MT and from a CU of a donor network node, a first message that includes first information associated with a token (block 810). For example, the network node (e.g., using antenna 252, DEMOD 254, MIMO detector 256, receive processor 258, controller/processor 280, reception component 1004, and/or the like) may receive, via an MT and from a CU of a donor network node, a first message that includes first information associated with a token, as described above.

As further shown in FIG. 8, in some aspects, process 800 may include transmitting, via a DU and to the CU of the donor network node, a second message that includes second information associated with the token, to thereby indicate collocation of the MT and the DU (block 820). For example, the network node (e.g., using controller/processor 240, transmit processor 220, TX MIMO processor 230, MOD 232, antenna 234, transmission component 1008, and/or the like) may transmit, via a DU and to the CU of the donor network node, a second message that includes second information associated with the token, to thereby indicate collocation of the MT and the DU, as described above.

Process 800 may include additional aspects, such as any single aspect or any combination of aspects described below and/or in connection with one or more other processes described elsewhere herein.

In a first aspect, the network node is an IAB node. In a second aspect, alone or in combination with the first aspect, the token is a BAP address of the network node. In a third aspect, alone or in combination with one or more of the first and second aspects, the second message further includes an identifier of the DU, and the identifier of the DU node is an F1-AP identifier of the DU.

In a fourth aspect, alone or in combination with one or more of the first through third aspects, process 800 further includes establishing (e.g., using transmit processor 264, TX MIMO processor 266, MOD 254, antenna 252, DEMOD 254, MIMO detector 256, receive processor 258, controller/processor 280, memory 282, reception component 1004, and/or transmission component 1008) an RRC connection to the CU of the donor network node prior to receiving the first message. In a fifth aspect, alone or in combination with one or more of the first through fourth aspects, the first message is received via RRC signaling, and the second message is transmitted via F1-AP signaling. In a sixth aspect, alone or in combination with one or more of the first through fifth aspects, the second message is an F1-AP setup request message, an F1-AP DU configuration update message, or an F1-AP DU status indication message.

In a seventh aspect, alone or in combination with one or more of the first through sixth aspects, process 800 further includes receiving (e.g., using antenna 252, DEMOD 254, MIMO detector 256, receive processor 258, controller/processor 280, memory 282, and/or reception component 1004), via the MT, a packet addressed with the token. In an eighth aspect, alone or in combination with one or more of the first through seventh aspects, process 800 further includes receiving (e.g., using antenna 252, DEMOD 254, MIMO detector 256, receive processor 258, controller/processor 280, memory 282, and/or reception component 1004), via the MT, a packet addressed with another token, and providing the packet to the DU for forwarding to another network node associated with the other token.

In a ninth aspect, alone or in combination with one or more of the first through eighth aspects, process 800 further includes receiving (e.g., using antenna 252, DEMOD 254, MIMO detector 256, receive processor 258, controller/processor 280, memory 282, and/or reception component 1004), via the MT, a message that includes information for the DU, and providing the information to the DU. In a tenth aspect, alone or in combination with one or more of the first through ninth aspects, process 800 further includes receiving (e.g., using antenna 252, DEMOD 254, MIMO detector 256, receive processor 258, controller/processor 280, memory 282, and/or reception component 1004), via the MT, a configuration for the DU, and configuring the DU according to the configuration.

In an eleventh aspect, alone or in combination with one or more of the first through tenth aspects, process 800 further includes receiving (e.g., using antenna 252, DEMOD 254, MIMO detector 256, receive processor 258, controller/processor 280, memory 282, and/or reception component 1004) a configuration that identifies a first portion of a resource that is to be used by the MT node and a second portion of the resource that is to be used by the DU node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
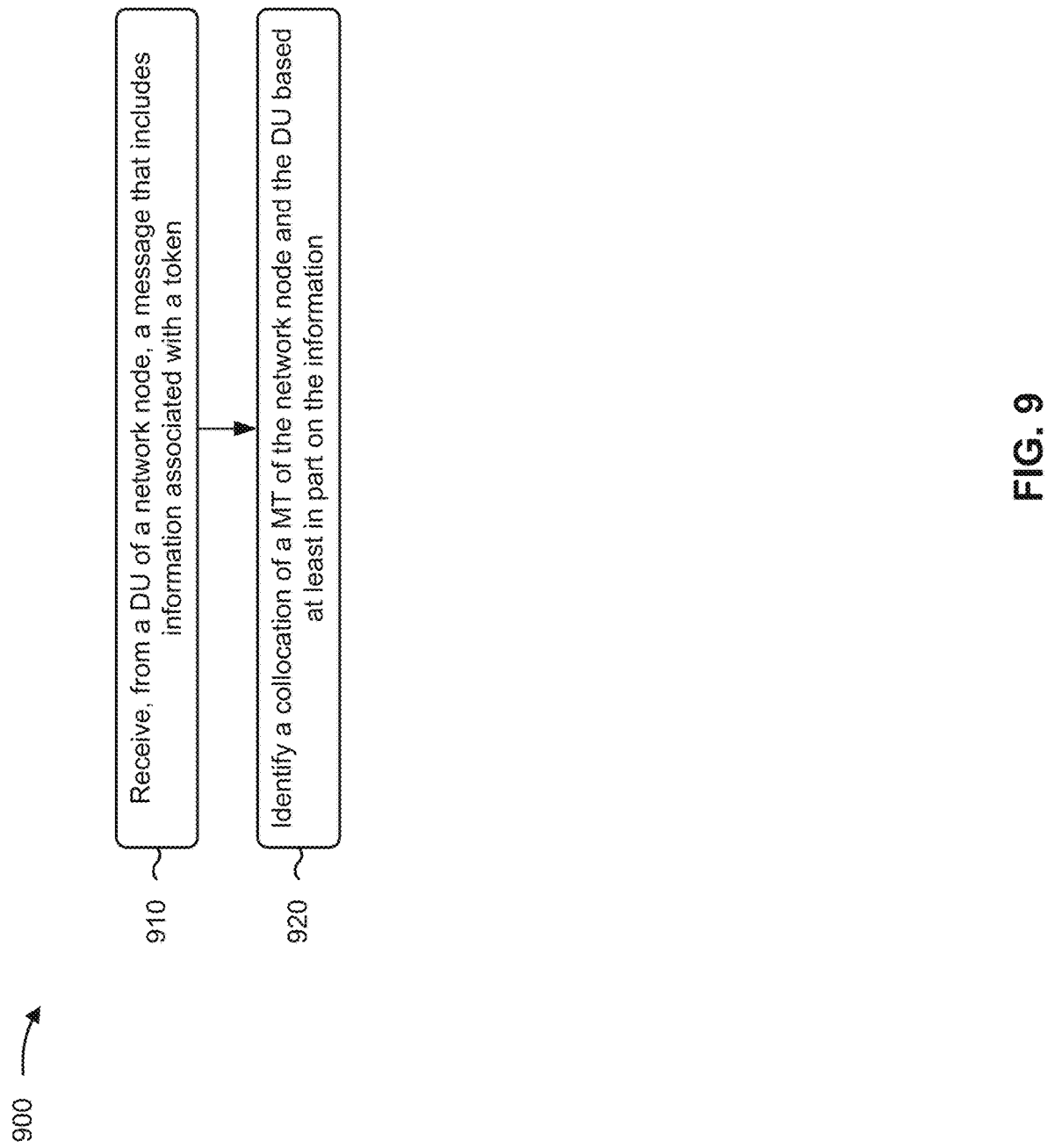
FIG. 9 is a diagram illustrating an example process performed, for example, by a donor network node, in accordance with various aspects of the present disclosure.

FIG. 9 is a diagram illustrating an example process 900 performed, for example, by a donor network node, in accordance with various aspects of the present disclosure. Example process 900 is an example where a donor network node (e.g., a BS 110, an IAB donor node, a CU, and/or the like) performs operations associated with IAB topology discovery.

As shown in FIG. 9, in some aspects, process 900 may include receiving, from a DU of a network node, a message that includes information associated with a token (block 910). For example, the donor network node (e.g., using antenna 234, DEMOD 232, MIMO detector 236, receive processor 238, controller/processor 240, reception component 1106, and/or the like) may receive, from a DU of a network node, a message that includes information associated with a token, as described above.

As further shown in FIG. 9, in some aspects, process 900 may include identifying a collocation of an MT of the network node and the DU based at least in part on the information (block 920). For example, the donor network node (e.g., using controller/processor 240, determination component 1108, and/or the like) may identify a collocation of an MT of the network node and the DU based at least in part on the information, as described above.

Process 900 may include additional aspects, such as any single aspect or any combination of aspects described below and/or in connection with one or more other processes described elsewhere herein.

In a first aspect, process 900 further includes storing a mapping of an identifier of the MT to an identifier of the DU.

In a second aspect, alone or in combination with the first aspect, the network node is an IAB node. In a third aspect, alone or in combination with one or more of the first and second aspects, the token is a BAP address of the network node. In a fourth aspect, alone or in combination with one or more of the first through third aspects, the message further includes an identifier of the DU, and the identifier of the DU is an F1-AP identifier of the DU.

In a fifth aspect, alone or in combination with one or more of the first through fourth aspects, process 900 further includes establishing (e.g., using transmit processor 220, TX MIMO processor 230, modulator 232, antenna 234, DEMOD 232, MIMO detector 236, receive processor 238, controller/processor 240, memory 242, scheduler 246, reception component 1106, and/or transmission component 1104) an RRC connection to the network node. In a sixth aspect, alone or in combination with one or more of the first through fifth aspects, the second is received via F1-AP signaling. In a seventh aspect, alone or in combination with one or more of the first through sixth aspects, the message is an F1-AP setup request message, an F1-AP DU configuration update message, or an F1-AP DU status indication message.

In an eighth aspect, alone or in combination with one or more of the first through seventh aspects, process 900 further includes transmitting (e.g., using transmit processor 220, TX MIMO processor 230, modulator 232, antenna 234, controller/processor 240, memory 242, scheduler 246, and/or transmission component 1104), to the MT of the network node, a packet addressed with the token. In a ninth aspect, alone or in combination with one or more of the first through eighth aspects, process 900 further includes transmitting (e.g., using transmit processor 220, TX MIMO processor 230, modulator 232, antenna 234, controller/processor 240, memory 242, scheduler 246, and/or transmission component 1104), to the MT of the network node, a packet addressed with another token that is to be forwarded by the DU to another network node associated with the other token.

In a tenth aspect, alone or in combination with one or more of the first through ninth aspects, process 900 further includes transmitting (e.g., using transmit processor 220, TX MIMO processor 230, modulator 232, antenna 234, controller/processor 240, memory 242, scheduler 246, and/or transmission component 1104), to the MT of the network node, a message that includes information for the DU. In an eleventh aspect, alone or in combination with one or more of the first through tenth aspects, process 900 further includes transmitting (e.g., using transmit processor 220, TX MIMO processor 230, modulator 232, antenna 234, controller/processor 240, memory 242, scheduler 246, and/or transmission component 1104), to the MT of the network node, a configuration for the DU.

In a twelfth aspect, alone or in combination with one or more of the first through eleventh aspects, process 900 further includes transmitting (e.g., using transmit processor 220, TX MIMO processor 230, modulator 232, antenna 234, controller/processor 240, memory 242, scheduler 246, and/or transmission component 1104) a configuration that identifies a first portion of a resource that is to be used by the MT and a second portion of the resource that is to be used by the DU. In a thirteenth aspect, alone or in combination with one or more of the first through twelfth aspects, process 900 further includes transmitting (e.g., using transmit processor 220, TX MIMO processor 230, modulator 232, antenna 234, controller/processor 240, memory 242, scheduler 246, and/or transmission component 1104), to the MT of the network node, another message that includes information associated with the token, and the other message is transmitted via RRC signaling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
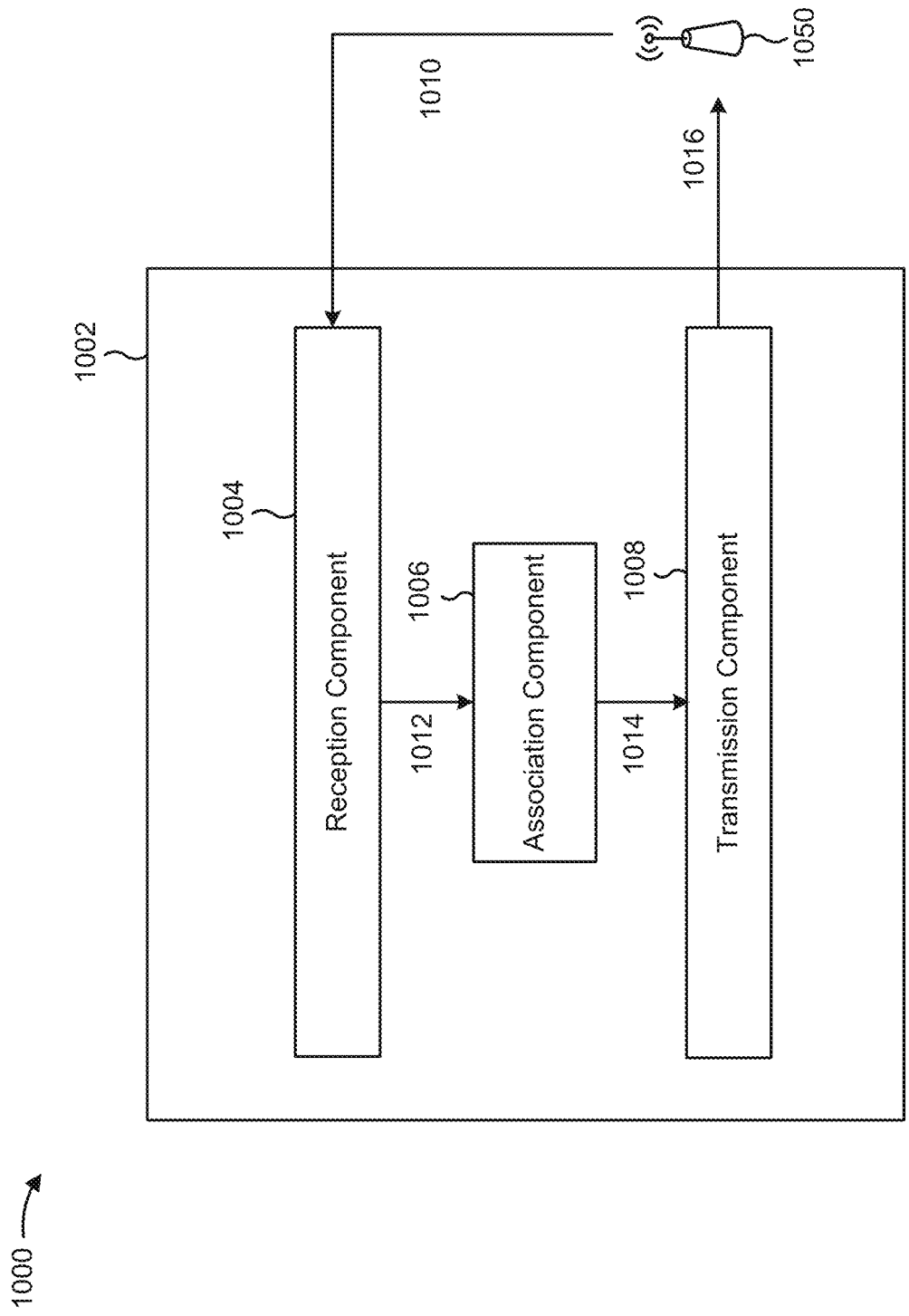
FIGS. 10 and 11 are diagrams illustrating data flows between different modules/means/components in example apparatuses, in accordance with various aspects of the present disclosure.

FIG. 10 is a diagram 1000 illustrating data flow between different modules/means/components in an example apparatus 1002. The apparatus 1002 may be a network node (e.g., a BS 110, a UE 120, an IAB node, and/or the like). In some aspects, the apparatus 1002 includes a reception component 1004, an association component 1006, and/or a transmission component 1008.

The reception component 1004 may receive, from a donor network node 1050 (e.g., a BS 110, an IAB donor node, a CU, and/or the like) and as data 1010, a first message that includes first information associated with a token. For example, based on establishing a first connection (e.g., an RRC connection) between the apparatus 1002 and the donor network node 1050, the reception component 1004 may receive the first message that includes the first information associated with the token. The reception component 1004 may be associated with an MT node of the apparatus 1002.

The association component 1006 may receive, from the reception component 1004 and as data 1012, information associated with the token. The association component 1006 may store the information associated with the token. For example, the association component 1006 may store the information associated with the token in association with an identifier of the donor network node 1050.

The transmission component 1008 may receive, from the association component 1006 and as data 1014, information associated with the token. Moreover, the transmission component 1008 may transmit, to the donor network node 1050 and as data 1016, a second message that includes second information associated with the token. For example, based on establishing a second connection (e.g., an F1-AP connection), or as part of a procedure for establishing the second connection, between the apparatus 1002 and the donor network node 1050, the transmission component 1008 may transmit the second message that includes the second information associated with the token. The transmission component 1008 may be associated with a DU node of the apparatus 1002. In some aspects, the second message that includes the second information associated with the token may provide an indication of a collocation of the reception component 1004 and the transmission component 1008 at the apparatus 1002.

The apparatus 1002 may include additional components that perform each of the blocks of the algorithm in the aforementioned process 800 of FIG. 8, process 900 of FIG. 9, and/or the like. Each block in the aforementioned process 800 of FIG. 8, process 900 of FIG. 9, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
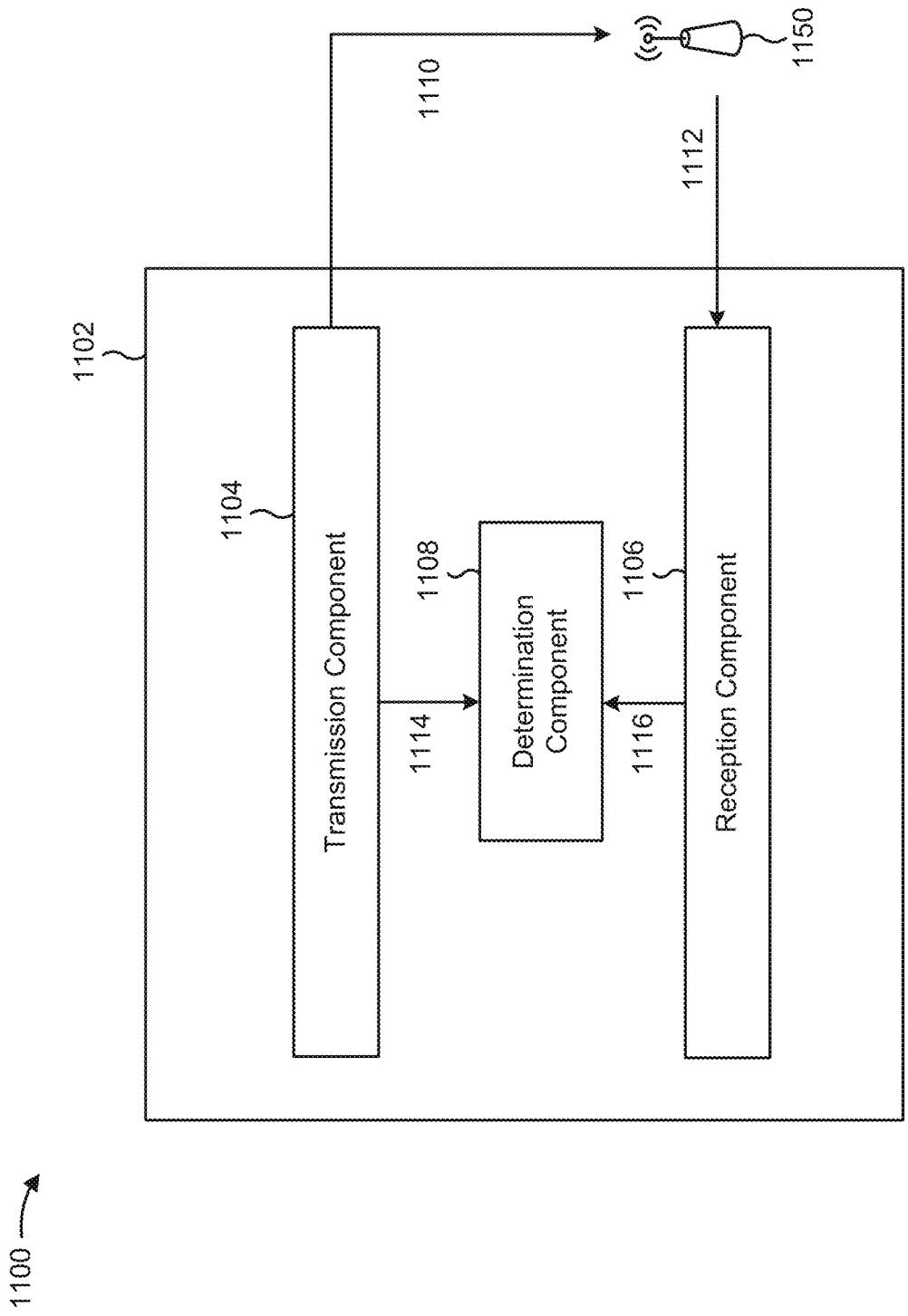

FIG. 11 is a diagram 1100 illustrating data flow between different modules/means/components in an example apparatus 1102. The apparatus 1102 may be a donor network node (e.g., a BS 110, an IAB donor node, a CU, and/or the like). In some aspects, the apparatus 1102 includes a transmission component 1104, a reception component 1106, and/or determination component 1108.

The transmission component 1104 may transmit, to a network node 1150 (e.g., a BS 110, a UE 120, an IAB node, and/or the like) and as data 1110, a first message that includes first information associated with a token. For example, based on establishing a first connection (e.g., an RRC connection) between the apparatus 1102 and the network node 1150, the transmission component 1104 may transmit the first message that includes the first information associated with the token. The transmission component 1104 may transmit the first message that includes the first information associated with the token to an MT node of the network node 1150.

The reception component 1106 may receive, from the network node 1150 and as data 1112, a second message that includes second information associated with the token. For example, based on establishing a second connection (e.g., an F1-AP connection), or as part of a procedure for establishing the second connection, between the apparatus 1102 and the network node 1150, the reception component 1106 may receive the second message that includes the second information associated with the token. The reception component 1106 may receive the second message that includes the second information associated with the token from a DU node of the network node 1150. In some aspects, the second message may also include an identifier of the DU node.

The determination component 1108 may receive, from the transmission component 1104 and as data 1114, information associated with the first message. For example, the determination component 1108 may receive, from the transmission component 1104, the first information associated with the token. In addition, the determination component 1108 may receive, from the reception component 1106 and as data 1116, information associated with the second message. For example, the determination component 1108 may receive, from the reception component 1106, the second information associated with the token. The determination component 1108 may compare the first information associated with the token and the second information associated with the token. Moreover, the determination component 1108 may identify a collocation of the MT node and the DU node at the network node 1150 based at least in part on a determination that the first information corresponds to the second information.

The apparatus 1102 may include additional components that perform each of the blocks of the algorithm in the aforementioned process 800 of FIG. 8, process 900 of FIG. 9, and/or the like. Each block in the aforementioned process 800 of FIG. 8, process 900 of FIG. 9, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a central unit (CU) of a donor network node, comprising:
   transmitting, to a mobile termination (MT) node, a first message that includes first information associated with a token;
   receiving, from a distributed unit (DU) node, a second message that includes second information associated with the token;
   determining a collocation of the MT node and the DU node based on both the first information and the second information being associated with the token; and
   transmitting, to the MT node, a configuration for the DU.

2. The method of claim 1, wherein the donor network node is an integrated access and backhaul node.

3. The method of claim 1, wherein the token is a backhaul adaptation protocol address.

4. The method of claim 1, wherein the second message further includes an identifier of the DU node, and
   wherein the identifier of the DU node is an F1-application protocol identifier of the DU node.

5. The method of claim 1, further comprising:
   establishing a radio resource control connection to the MT node prior to transmitting the first message.

6. The method of claim 1, wherein the first message is transmitted via radio resource control signaling, and
   wherein the second message is received via F1-application protocol signaling.

7. The method of claim 1, wherein the second message is an F1-application protocol (AP) setup request message, an F1-AP DU configuration update message, or an F1-AP DU status indication message.

8. The method of claim 1, further comprising:
   transmitting, to the MT node, a packet addressed with the token.

9. The method of claim 1, further comprising:
   transmitting, to the MT node, a packet addressed with another token; and
   receiving the packet from the DU node for forwarding to another network node associated with the other token.

10. The method of claim 1, further comprising:
    transmitting, to the MT node, a message that includes information for the DU node.

11. The method of claim 1,
    wherein the DU node is configured according to the configuration.

12. The method of claim 1, wherein transmitting the configuration comprises:
    transmitting a configuration that identifies a first portion of a resource that is to be used by the MT node and a second portion of the resource that is to be used by the DU node.

13. A method of wireless communication performed by a central unit of a donor network node, comprising:

receiving, from a distributed unit (DU) of a network node, a first message that includes a backhaul adaptation protocol address of the network node;

identifying, based at least in part on the backhaul adaptation protocol address, a collocation of a mobile termination (MT) and the DU; and transmitting, based on receiving the first message, a configuration for the DU in a second message.

14. The method of claim 13, further comprising:
storing a mapping of an identifier of the MT to an identifier of the DU.

15. The method of claim 13, wherein the network node is an integrated access and backhaul node.

16. The method of claim 13, wherein the first message further includes an identifier of the DU, and
wherein the identifier of the DU is an F1-application protocol identifier of the DU.

17. The method of claim 13, further comprising:
establishing a radio resource control connection to the network node.

18. The method of claim 13, wherein the first message is received via F1-application protocol signaling.

19. The method of claim 13, wherein the first message is an F1-application protocol (AP) setup request message, an F1-AP DU configuration update message, or an F1-AP DU status indication message.

20. The method of claim 13,
wherein the second message is transmitted via radio resource control signaling.

21. The method of claim 13, further comprising:
transmitting, to the MT, a packet addressed with the backhaul adaptation protocol address.

22. The method of claim 13, further comprising:
transmitting, to the MT, a packet addressed with a token that is to be forwarded by the DU to another network node associated with the token.

23. The method of claim 13, wherein transmitting the configuration for the DU in the second message comprises:
transmitting, to the MT, the second message.

24. The method of claim 13, wherein transmitting the configuration for the DU comprises:
transmitting the configuration for the DU to the MT.

25. The method of claim 13, wherein transmitting the configuration comprises:

transmitting a configuration that identifies a first portion of a resource that is to be used by the MT and a second portion of the resource that is to be used by the DU.

26. A central unit (CU) of a donor network node for wireless communication, comprising:
a memory; and
one or more processors coupled to the memory, the one or more processors configured to:
transmit to a mobile termination (MT) node, a first message that includes first information associated with a token;
receive, from a distributed unit (DU) node, a second message that includes second information associated with the token;
determine a collocation of the MT node and the DU node based on both the first information and the second information being associated with the token; and
transmit, to the MT node, a configuration for the DU node.

27. The CU of claim 26, wherein the token is a backhaul adaptation protocol address.

28. A central unit of a donor network node for wireless communication, comprising:
a memory; and
one or more processors coupled to the memory, the one or more processors configured to:
receive, from a distributed unit (DU) of a network node, a first message that includes a backhaul adaptation protocol address of the network node;
identify, based at least in part on the backhaul adaptation protocol address, a collocation of a mobile termination (MT) and the DU; and
transmit, based on receiving the first message, a configuration for the DU in a second message.

29. The central unit of claim 28, wherein the network node is an integrated access and backhaul node.

30. The central unit of claim 28, wherein the first message is an F1-application protocol (AP) setup request message, an F1-AP DU configuration update message, or an F1-AP DU status indication message.

\* \* \* \* \*